United States Patent
Franz et al.

(10) Patent No.: US 9,022,638 B2
(45) Date of Patent: May 5, 2015

(54) MIXING AND KNEADING MACHINE FOR CONTINUAL COMPOUNDING AND METHOD OF IMPLEMENTING CONTINUAL COMPOUNDING BY MEANS OF A MIXING AND KNEADING MACHINE

(75) Inventors: Peter Franz, Birsfelden (CH); Joel Stampfli, Sissach (CH); Hans-Ulrich Siegenthaler, Suhr (CH)

(73) Assignee: Buss AG (CH)

( * ) Notice: Subject to any disclaimer, the term of this patent is extended or adjusted under 35 U.S.C. 154(b) by 1332 days.

(21) Appl. No.: 12/777,044

(22) Filed: May 10, 2010

(65) Prior Publication Data
US 2010/0284236 A1 Nov. 11, 2010

(30) Foreign Application Priority Data

May 11, 2009 (CH) ...................................... 0730/09

(51) Int. Cl.
| | |
|---|---|
| *B29C 47/64* | (2006.01) |
| *B29B 7/44* | (2006.01) |
| *B29B 7/42* | (2006.01) |
| *B29C 47/00* | (2006.01) |
| *B29C 47/66* | (2006.01) |
| *B29C 47/60* | (2006.01) |
| *B29C 47/44* | (2006.01) |

(52) U.S. Cl.
CPC . *B29B 7/44* (2013.01); *B29B 7/423* (2013.01); *B29C 47/0011* (2013.01); *B29C 47/44* (2013.01); *B29C 47/64* (2013.01); *B29C 47/667* (2013.01); *B29C 47/605* (2013.01)

(58) Field of Classification Search
USPC .................. 366/78, 80–82, 90, 289, 319, 322
See application file for complete search history.

(56) References Cited

U.S. PATENT DOCUMENTS

| | | | | |
|---|---|---|---|---|
| 405,591 | A * | 6/1889 | Parrish .......................... | 366/277 |
| 2,505,125 | A * | 4/1950 | List ................................. | 366/80 |
| 2,838,794 | A * | 6/1958 | Munger et al. ................. | 366/81 |
| 3,346,242 | A * | 10/1967 | List ................................. | 366/81 |
| 3,347,528 | A * | 10/1967 | List et al. ........................ | 366/75 |
| 3,456,599 | A * | 7/1969 | Baker ............................. | 366/77 |
| 3,841,611 | A * | 10/1974 | Ronner .......................... | 366/78 |
| 6,709,147 | B1 * | 3/2004 | Rauwendaal ................... | 366/80 |
| 2007/0183253 | A1 * | 8/2007 | Siegenthaler ................... | 366/80 |

FOREIGN PATENT DOCUMENTS

| | | |
|---|---|---|
| CH | 528294 A | 9/1972 |
| CH | 545178 A | 12/1973 |

(Continued)

*Primary Examiner* — David Sorkin
(74) *Attorney, Agent, or Firm* — Maginot, Moore & Beck, LLP

(57) ABSTRACT

A mixing and kneading machine (1) for continual compounding comprises a screw shaft (3) rotating in a casing (2) and simultaneously moving axially translationally. To sustainably enhance the efficiency of the machine as regards its material thruput per unit of time the screw shaft (3) comprises at least four groups of radial screw vanes (4a, 4b, 4c, 4d) evenly distributed circumferentially, each group consisting of a plurality of screw vanes in axial sequence. The outer diameter ($D_a$) of the screw shaft ranges from 400 to 800 millimeters. The rotary speed of the screw shaft (3) ranges from 30 to 80 rpm. A mixing and kneading machine (1) engineered as such is particularly suitable for compounding an anodic mass in the production of electrodes—anodes—for the aluminum industry.

18 Claims, 4 Drawing Sheets

(56) References Cited

FOREIGN PATENT DOCUMENTS

| | | | |
|---|---|---|---|
| EP | 0393379 A1 | 10/1990 |
| EP | 2018946 A2 | 1/2009 |
| FR | 2143668 A1 | 9/1973 |

* cited by examiner

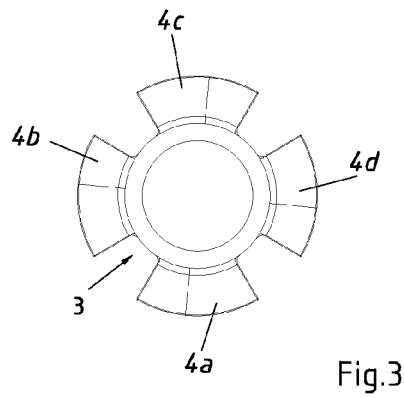 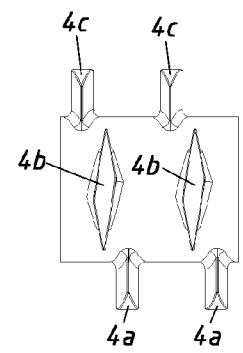
Fig.3    Fig.4
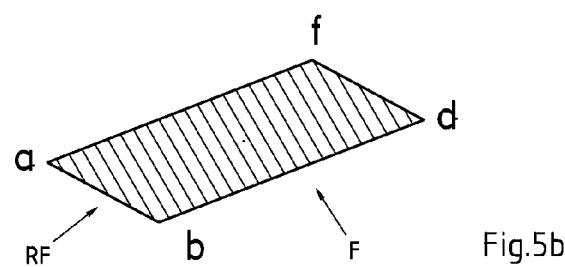
Fig.5b
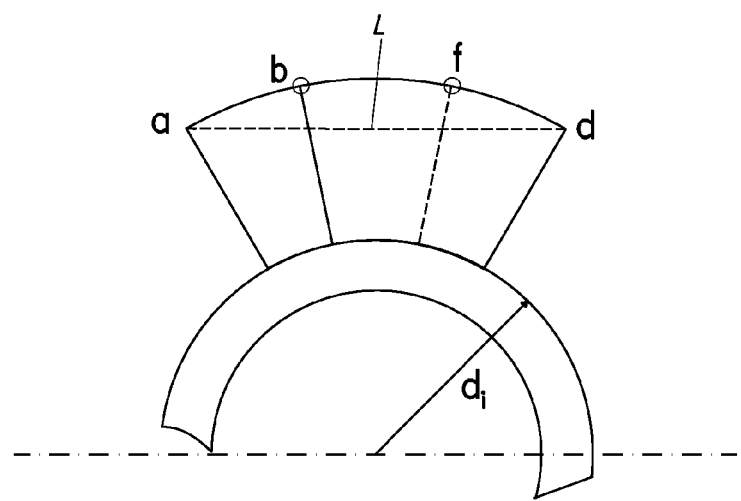
Fig.5a

| | Patent CH 528294 | | | Invention Machine | | |
|---|---|---|---|---|---|---|
| screw shaft outer diameter machine 1 | b | 200.00 | [mm] | Da1 | 200.00 | [mm] |
| screw shaft outer diameter machine 2 | e | 400.00 | [mm] | Da2 | 400.00 | [mm] |
| screw shaft outer diameter machine 3 | Da3 | 600.00 | [mm] | Da3 | 600.00 | [mm] |
| screw shaft inner diameter machine 1 | a | 130.00 | [mm] | Di1 | 102.00 | [mm] |
| screw shaft inner diameter machine 2 | d | 330.00 | [mm] | Di2 | 204.00 | [mm] |
| screw shaft inner diameter machine 3 | Di3 | 530.00 | [mm] | Di3 | 306.00 | [mm] |
| screw channel depth machine 1 | s1 | 35.00 | [mm] | s1 | 49.00 | [mm] |
| screw channel depth machine 2 | s2 | 35.00 | [mm] | s2 | 98.00 | [mm] |
| screw channel depth machine 3 | s3 | 35.00 | [mm] | s3 | 147.00 | [mm] |
| difference b-a resp. Da1-Di1 | b-a | 70.00 | [mm] | Da1-Di1 | 98.00 | [mm] |
| difference e-d resp. Da2-Di2 | e-d | 70.00 | [mm] | Da2-Di2 | 196.00 | [mm] |
| difference Da3 Di3 | Da1-Di3 | 70.00 | [mm] | Da1-Di3 | 294.00 | [mm] |
| ratio b/a resp. Da1/Di1 | b/a | 1.54 | [-] | Da1/Di1 | 1.96 | [-] |
| ratio e/d resp. Da2/Di2 | e/d | 1.21 | [-] | Da2/Di2 | 1.96 | [-] |
| ratio Da3/Di3 | Da3/Di3 | 1.13 | [-] | Da3/Di3 | 1.96 | [-] |
| free volume machine 1 | V1 | 3628539.51 | [mm^3] | V1 | 4648928.81 | [mm^3] |
| free volume machine 2 | V2 | 16055538.46 | [mm^3] | V2 | 37191430.47 | [mm^3] |
| free volume machine 3 | V3 | 37274996.83 | [mm^3] | V3 | 125521077.84 | [mm^3] |
| free surface machine 1 | A1 | 207345.12 | [mm^2] | A1 | 189752.20 | [mm^2] |
| free surface machine 2 | A2 | 917345.05 | [mm^2] | A2 | 759008.79 | [mm^2] |
| free surface machine 3 | A3 | 2129999.82 | [mm^2] | A3 | 1707769.77 | [mm^2] |
| volume ratio machine 2 to machine 1 | V2/V1 | 4.42 | [-] | V2/V1 | 8.00 | [-] |
| volume ratio machine 3 to machine 1 | V3/V1 | 10.27 | [-] | V3/V1 | 27.00 | [-] |
| surface ratio machine 2 to machine 1 | A2/A1 | 4.42 | [-] | A2/A1 | 4.00 | [-] |
| surface ratio machine 3 to machine 1 | A3/A1 | 10.27 | [-] | A3/A1 | 9.00 | [-] |
| volume to surface ratio machine 1 | V1/A1 | 17.50 | [-] | V1/A1 | 24.50 | [-] |
| volume to surface ratio machine 2 | V2/A2 | 17.50 | [-] | V2/A2 | 49.00 | [-] |
| volume to surface ratio machine 3 | V3/A3 | 17.50 | [-] | V3/A3 | 73.50 | [-] |

Fig. 7

MIXING AND KNEADING MACHINE FOR CONTINUAL COMPOUNDING AND METHOD OF IMPLEMENTING CONTINUAL COMPOUNDING BY MEANS OF A MIXING AND KNEADING MACHINE

BACKGROUND

The invention relates to a mixing and kneading machine for continual compounding including a screw shaft rotating in a casing and simultaneously moving axially translationally. The invention also relates to a method of implementing continual compounding by means of a mixing and kneading machine engineered.

Mixing and kneading machines of the kind presently involved are employed particularly for compounding bulk-flowable (powder, granulate, flakes, etc.), plastic and/or pasty masses.

The working member of the mixing and kneading machine is usually configured as a so-called screw shaft which forwards the material for processing axially.

In conventional mixing and kneading machines the working member merely produces a rotational motion. In addition, mixing and kneading machines are also known in which the working member rotates whilst at the same time moving translationally. The motion profile of the working member is characterized particularly by the main shaft executing a sinusoidal motion overlying the rotation. This motion profile permits casing-mounting such fitted items as kneader pins or kneader teeth. For this purpose the curved vane of the screw shaft is discontinued to form discrete kneader or screw vanes. The screw vanes disposed on the main shaft and the casing-mounted fitted items interact in thus creating the desired shear/mixing and kneading functions in the various processing zones. Such mixing and kneading machines of the last-mentioned kind are known to persons skilled in the art under the trade name Buss Ko Kneaders®.

One such Buss Ko Kneader® is described in Swiss patent CH 528 294, it comprising a casing in which a quill shaft is mounted to simultaneously combine its rotary and reciprocating motion. The shaft is engineered with four screw vanes or a multiple thereof, each cooperating with kneader teeth lining the casing. In a first example embodiment the inner diameter of the casing is 200 mm, it being 400 mm in a second example embodiment and 600 mm in a third example embodiment, resulting in the outer diameter of the shaft being a tight 200 mm in the first example, a tight 400 mm in the second and a tight 600 mm in the third example. For all casing diameters the effective length of the machine is given as 1390 mm, corresponding to a ratio of processing space length (Pl) to screw shaft outer diameter (Da) ranging from approx 2.3 to 7. The difference between the diameter of the casing and the diameter of the shaft core is for all sizes 70 mm. The ratio of screw shaft outer diameter (Da) to screw shaft inner diameter (Di) thus ranges from approx 1.13 to 1.54. The number of axial movements of the screw shaft is proportional to the casing diameter whilst shaft rpm is selected inversely proportional to the casing diameter. For a casing diameter of 400 min the screw shaft performs two axial movements per revolution, whilst for a casing diameter of 600 mm it performs three axial movements per revolution. The geometric core parameters (a, b and d, e resp.) are selected for this machine so that no matter what its size its screw channel depth (s) is always the same: $s=(b-a)/2=(e-d)/2$. This results in the ratio numbers for the surface and volume of each size being formed the same. The significance of this is that scaling the size up or down always needs to be achieved via the available surface. This is why this machine is only suitable for methods and processing defined exclusively by surface actions (e.g. heat exchange). On top of this, with a machine engineered as such, only relatively small amounts of material can be processed per unit of time, because scaling up or down is possible maximally over the square ratio of the screw outer diameter.

It is on the basis of this prior art that future methods and machines need to ensure that the methods and the scaling up/down associated therewith are operated as near as possible to the volume actions involved. This calls for the geometric ratios needing to be selected so that—in the terms as recited above—at least the ratios b/a and e/d, but preferably all other values too within the series result in more or less the same values in thus making it possible to scale up or down over the cubic ratio of the screw outer diameter.

For certain areas of application such as, for instance, in compounding an anodic mass in the production of electrodes, such as anodes, for the aluminum industry there is a need for sustainably boosting the output of the machine without having to engineer the machine substantially larger which, in addition to adding to the costs, also involves other drawbacks; for example, the mechanical stress (both static and dynamic) being increased out of all proportion, differences in the thermal expansion between the screw shaft and casing along with an unfavorable change in the surface to volume ratio. Since in obtaining aluminum by means of electrolysis each anode is consumed due to the oxygen resulting in the process, the anode needs to be replaced new every time. Producing aluminum is usually done by means of fused salt electrolysis of aluminum oxide by the cryolite clay process in which aluminum oxide is dissolved in a cryolite melt to lower the melting point. At this time, the annual demand for electrode masses in the aluminum industry is estimated to be around 13 million tons per year worldwide.

Mixing and kneading machines for compounding an electrode mass are known in which the screw diameter is 700 mm, it being particularly the screw diameter that dictates the material thruput in the production of the electrode mass which is substantially compounded from coke and pitch, amounting to 55,000 kg/h with the largest shaft diameters. Depending on the size of the mixing and kneading machine the screw shafts of known machines are run at speeds ranging from 20 to 60 rpm.

SUMMARY

The invention is based on the object of sophisticating a mixing and kneading machine such that its thruput for a given size can now be sustainably enhanced, the machine being particularly suitable for compounding anodic masses. This object is achieved by a mixing and kneading machine comprising a screw shaft having four to six groups of radial screw vanes evenly distributed circumferentially, each group consisting of a plurality of screw vanes in axial sequence and the ratio of processing space length (Pl) to screw shaft outer diameter (Da) ranging from 8 to 12. The vanes make it possible to sustainably enhance the quality in dispersion, mixing and homogenizing as compared to machines conventionally having three screw vanes at the most. This is now made possible without having to make the machine itself larger, thus achieving an appreciable increase in the thruput for the given machine size. Tests to this end have demonstrated that the thruput, as compared to that of conventional machines, can be boosted by as much as 50%, thus now making it possible to compound as high as 100 tons anodic mass per hour with a mixing and kneading machine having a screw shaft outer diameter (Da) ranging from approx. 700 to 800.

Another object of the invention involves proposing a method of implementing continual compounding by employing a mixing and kneading machine engineered by means of which the material thruput per unit of time can be increased. To achieve this object it is proposed that the screw shaft comprising at least four groups of screw vanes is operated at a rotational speed ranging from 30 to 80 rpm, the screw shaft outer diameter (Da) ranging preferably from 400 to 800 millimeters.

DESCRIPTION OF THE FIGURES

The invention will now be detailed with reference to the drawings in which:

FIG. 3 is an end view of the screw shaft;

FIG. 4 is a side view of the screw shaft;

FIG. 5A is a side view of a screw vane;

FIG. 5B is a cross-section through the screw vane;

FIG. 7 is a parameter comparison Table.

DETAILED DESCRIPTION

Figure 1:
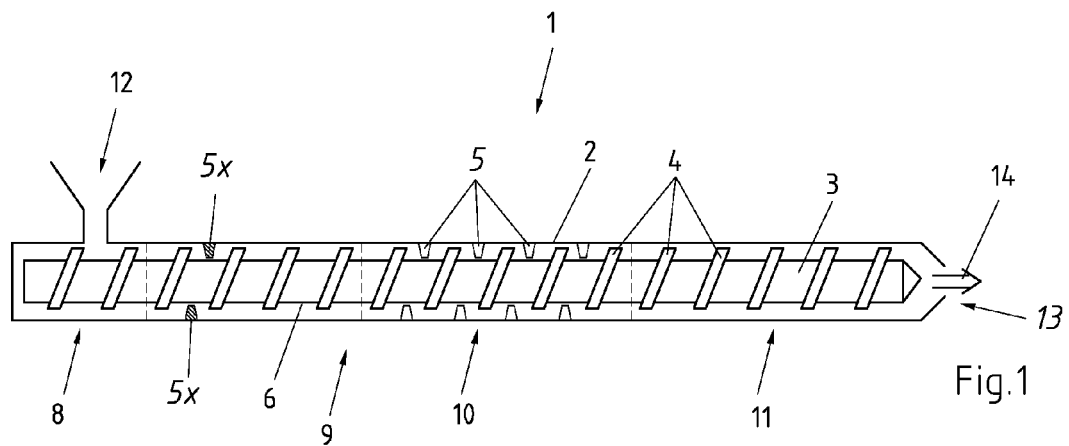
FIG. 1 is a longitudinal section through a mixing and kneading machine shown diagrammatically.

Referring now to FIG. 1 there is illustrated diagrammatically a longitudinal section through a mixing and kneading machine 1. The mixing and kneading machine 1 comprises surrounded by a casing 2 a working member in the form of a screw shaft 3 provided with a plurality of screw vanes 4 configured spirally. The screw vanes 4 of the screw shaft 3 are discontinued circumferentially to create axial apertures for the kneader pins 5 arranged at the casing 2 in enabling the screw shaft 3 in addition to its actual rotational motion to also perform an axial i.e. translational motion. Formed between the inner side of the casing 2 and the screw shaft 3 is the actual processing space 6 which usually comprises a plurality of processing zones 8-11 in sequence. In the present example the mixing and kneading machine 1 features, for example, an infeed zone 8, a melting zone 9, a mixing/dispersing zone 10 as well as a vent zone 11. At its infeed end the mixing and kneading machine 1 is provided with a hopper 12 whilst at its outfeed end a discharge opening 13 is provided via which the compounded material can exit in the direction of the arrow 14. The basic configuration of such a mixing and kneading machine is known, for example, from Swiss patent CH 278, 575. Although in the example as shown kneader pins or kneader teeth 5 are illustrated only in the mixing/dispersing zone 10, kneader pins or teeth 5 may, of course, also be provided, as required, in other zones.

To inject one or more fluid component(s) at one or more ports into the processing space 6 kneader pins or teeth 5x are provided featuring an orifice for injecting a fluid component. Where compounding an electrode mass is concerned, fluid or fluidized pitch is fed thereinto via such kneader pins or teeth 5x.

Figure 2:
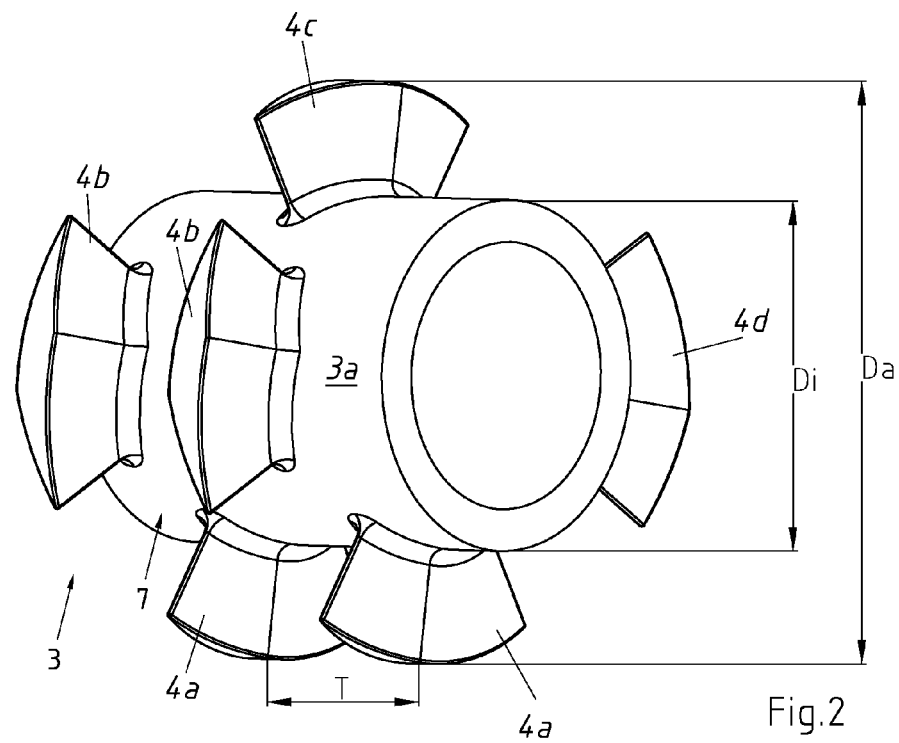
FIG. 2 is a view in perspective showing the geometry of a portion of a screw shaft in accordance with the invention.

Referring now to FIG. 2 there is illustrated the geometry of a portion—module—of a screw shaft 3 in accordance with the invention in perspective, a plurality of modules in sequence being arranged in line with the actual screw shaft in a mixing and kneading machine 1. The screw shaft 3 is intended for use in a mixing and kneading machine 1 in the form of a so-called single-screw extruder in which the screw shaft 3 is configured as a working member capable of simultaneous rotation and translational motion as is the case with the Buss Ko Kneader® mentioned at the outset. The screw shaft module 3a is provided with a total of four groups of screw vanes 4a-4d arranged evenly distributed about the circumference radially. Each group comprises a plurality of screw vanes in axial sequence 4a-4d, even when in one case just a single screw vane 4c is indicated, but as soon as a plurality of zones in sequence is formed, each group thus comprises a plurality of screw vanes in axial sequence.

Between the screw vanes 4a-4d both axially and radially a through-hole remains open into which kneader pins or teeth (not shown) arranged at the casing can extend. The inner diameter of the screw shaft 3 is identified as Di whilst the outer diameter of the screw shaft 3 is identified as Da. The inner diameter Di is determined by the outer cylindrical shell surface 7 of the screw shaft 3 whilst the outer diameter Da is determined by the diametral spacing between the highest or outermost portions of the diametrally opposed, axially staggered screw vanes 4a, 4c. The pitch, i.e. the mean distance between two screw vanes 4a-4a axial in sequence is identified as T. The stroke, i.e. the distance covered by the screw shaft 3 axially is identified as H.

Referring now to FIG. 3 there is illustrated how, in an end view, the four screw vanes 4a-4d are arranged evenly distributed about the circumference of the screw shaft 3 radially.

Referring now to FIG. 4 there is illustrated the screw shaft 3 in a side view showing how each group of screw vanes consists of a plurality of screw vanes in axial sequence 4a-4a, 4b-4b, 4c-4c, it being understood that the complete screw shaft made up of a plurality of modules comprises not just two screw vanes in axial sequence in each case, but a multiple thereof.

Referring now to FIG. 5a there is illustrated a side view of a screw vane 4c whilst FIG. 5B shows a cross-section through the screw vane 4c taken along the line L in FIG. 5a. The four edges of the screw vane 4c are identified a, b, c and d. Although the screw vane 4c is cross-sectionally depicted substantially as a parallelogram, in its entirety or shell surface it has a complex shape, at least the free-formed surfaces of which being configured as main surfaces, the advantage of which will now be detailled.

As related to the present example, the screw vane 4c rotates clockwise in operation so that the surface area between the edges b and d corresponds to the so-called forward flank F whilst the surface area between the edges a and b corresponds to the return flank RF. This is why the pitch of the forward flank F is termed pitch-bd whilst the pitch of the return flank RF is termed pitch-ab. Experience shows that the ratio of screw shaft outer diameter Da to the pitch of the forward flank pitch-bd ranges from 1.4 to 4.0, resulting in the product to be compounded being forwarded defined, sheared and realized with mixing actions involving defined flow distributions. The ratio of screw shaft outer diameter Da to the pitch of the return flank pitch-ab ranges from 1.4 to 4.0, this ratio ensuring that the relative motion of the product is always in the forward direction.

As already mentioned the side main surfaces of the screw vanes 4a-4d are engineered as free-formed surfaces. Preferably the main surfaces of the kneader pins (not shown) are likewise engineered as free-formed surfaces. A free-formed surface is a surface whose three-dimensional geometry has at no point a natural starting point. Now, because the main surfaces of the screw vanes 4a-4d and/or of the kneader pins are configured at least in part as free-formed surfaces, totally new possibilities are opened up for influencing the static as well as the dynamic screw shaft geometry, for example, as regards the gap remaining between a screw vane and the associated kneader pin or teeth. Particularly the size and orientation of this gap can now be varied practically to any degree whilst taking into account the axial motion of the screw shaft overlying the rotational motion. This ultimately now makes it possible to optimize the mechanical energy input and/or the change in the shear and extensional flow zones generated in the processing space and acting on the product being processed.

Figure 6:
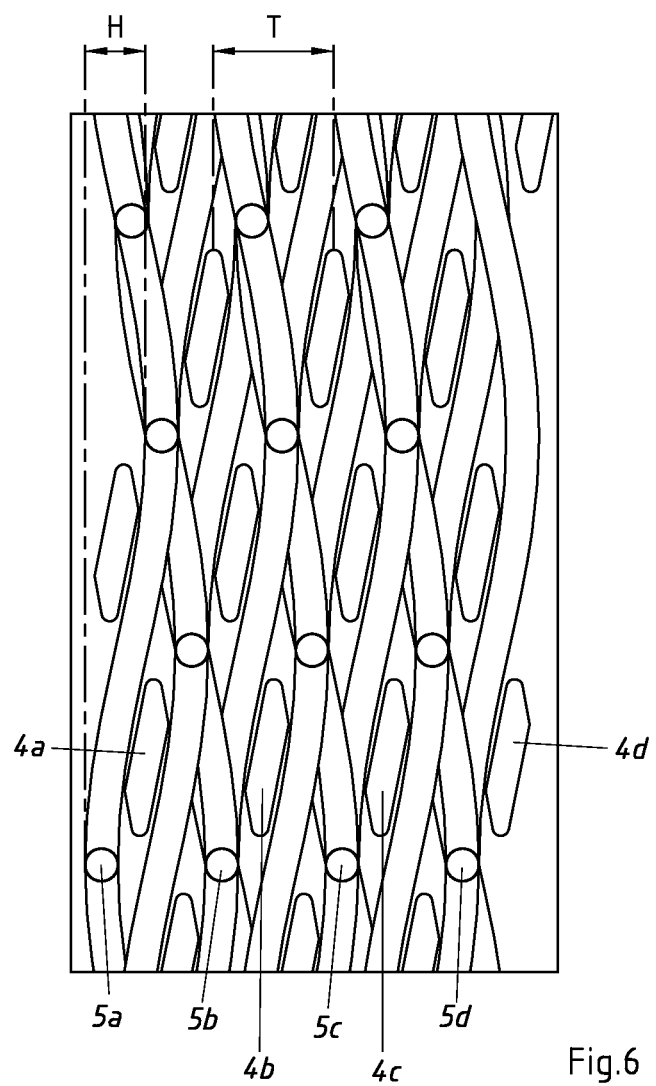
FIG. 6 is a diagrammatic view illustrating the motion of the kneader pins in relation to the screw vanes.

Referring now to FIG. 6 there is illustrated simplified the motion sequence of the screw shaft in translational motion, showing the inner side of the casing and respectively the shell surface of the working space full length, indicating only the screw vanes 4a, 4b, 4c, 4d. For the sake of simplicity the kneader pins 5a, 5b, 5c, 5d are depicted as round members. Evident from this FIG. is the motion of each screw vane 4a, 4b, 4c, 4d relative to each bordering kneader pin 5a, 5b, 5c, 5d. To make for a better overview the sequence in the motion is indicated kinematically reversed, i.e. the screw vanes 4a, 4b, 4c, 4d are assumed to be stationary whilst the kneader pins 5a, 5b, 5c, 5d are in motion over a sinusoidal path resulting from the rotational motion of the screw shaft and the overlying translational motion. Likewise indicated is the pitch T corresponding to the spacing between two axially juxtaposed kneader pins 5 and screw vanes 4c, 4f respectively. Also indicated is the stroke H of the screw shaft.

In addition to the requirement that the screw shaft comprises at least four groups of radial screw vanes evenly distributed circumferentially the ratios pertinent to the screw shaft 3 engineered in accordance with the invention are as follows:

the screw shaft outer diameter Da ranges from 400 to 800 millimeters;
the rotary speed of the screw shaft ranges from 30 to 80 rpm;
the ratio of screw shaft outer diameter Da to the pitch bd of the forward flank F ranges from 1.5 to 4.0;
the ratio of screw shaft outer diameter Da to the pitch ab of the return flank RF ranges from 1.0 to 4.0;
the individual elements of the machine are adapted to the operating parameters such that the mean residence time of the two components coke and pitch preferably ranges from 60 to 150 seconds in the processing space of the machine;
the ratio of processing space length PI to screw shaft outer diameter Da ranges from 8 to 12;
the temperature setting in the processing space ranges from 180° C. to 220° C.

A machine equipped with such a screw shaft is especially suitable for producing the anodic mass compounded substantially of carbon, preferably in the form of coke and pitch. As already mentioned, the pitch is added fluidized, requiring particular care to ensure that it can enter the pores in the coke sustained. Since this is done especially by diffusion the temperature in the processing space must range as defined from 180° C. to 220° C. and, for another thing, the two components need to remain together in the processing space of the machine with a residence time averaging from 60 to 150 seconds.

Unlike as in conventional machines the thruput can now be sustainably increased. The machine engineered in accordance with the invention having a screw shaft outer diameter Da of approx. 600 millimeters is capable of producing up to 60 tons of electrode mass per hour.

Preferably the machine is characterized by the following ratios:

the ratio Da/Di of screw shaft outer diameter Da to screw shaft inner diameter Di ranges from 1.5 to 2.0,
the ratio Da/H of screw shaft outer diameter Da to stroke H ranges from 4 to 6,
the ratio T/H of pitch T to stroke H ranges from 1.2 and 2.5.

Referring now to FIG. 7 there is illustrated a Table comparing the parameters of the machine described in the Swiss patent CH 528 294 to those of the mixing and kneading machine engineered in accordance with the invention. Some parameters, such as the outer diameter Da1 of the screw shaft were selected large enough to permit a comparison of the two machines, even though a Da1 of 200 mm eclipses the range claimed in the machine engineered in accordance with the invention. The Table lists typical values, it being understood that the listed values may vary within the scope as claimed and/or as described.

The invention claimed is:

1. A mixing and kneading machine (1) for continual compounding including a screw shaft (3) rotating in a casing (2) and defining a processing space therebetween, said screw shaft simultaneously moving axially translationally within the casing, the screw shaft (3) executing a reciprocation for each revolution, characterized in that the screw shaft (3) comprises four to six groups of radial screw vanes (4a, 4b, 4c, 4d) evenly distributed circumferentially, each group consisting of a plurality of screw vanes in axial sequence, wherein the ratio of the length of the processing space (PI) to the outer diameter (Da) of the screw shaft ranges from 8 to 12.

2. The mixing and kneading machine (1) as set forth in claim 1, characterized in that the screw shaft outer diameter (Da) ranges from 400 to 800 millimeters and the ratio Da/Di of screw shaft outer diameter (Da) to screw shaft inner diameter (Di) ranges from 1.5 to 2.0.

3. The mixing and kneading machine (1) as set forth in claim 1, characterized in that the mixing and kneading machine (1) comprises in the conveying direction a plurality of zones (8, 9, 10, 11) in sequence forming the processing space (6), the rotary speed of the screw shaft (3) as well as the pitch of the screw vanes (4a, 4b, 4c, 4d) being adapted to the processing space length (PI) such that the residence time of the product in the processing space (6) averages from 60 to 150 seconds.

4. The mixing and kneading machine (1) as set forth in claim 1, characterized in that the rotary speed of the screw shaft (3) ranges from 30 to 80 rpm.

5. The mixing and kneading machine (1) as set forth in claim 1, wherein each screw vane includes a forward flank (F) and a return flank defined relative to the direction of rotation of the screw shaft, characterized in that the ratio of screw shaft outer diameter (Da) to the pitch (bd) of the forward flank (F) ranges from 1.5 to 4.0.

6. The mixing and kneading machine (1) as set forth in claim 1, wherein each screw vane includes a forward flank and a return flank (RF) defined relative to the direction of rotation of the screw shaft, characterized in that the ratio of screw shaft outer diameter (Da) to the pitch (ab) of the return flank (RF) ranges from 1.0 to 4.0.

7. The mixing and kneading machine (1) as set forth in claim 3, characterized in that the processing space (6) is formed by at least one infeed zone (8), a transition zone as well as a mixing/homogenizing zone (10) and the mixing and kneading machine (1) is provided with kneader pins (5, 5x) or kneader teeth protruding into the processing space (6).

8. The mixing and kneading machine (1) as set forth in claim 3, characterized in that the processing space (6) is formed by at least one infeed zone (8), a melting zone (9), a mixing/dispersion zone (10) as well as a vent zone (11).

9. The mixing and kneading machine (1) as set forth in claim 1, characterized in that at least one kneader pin (5x) or kneader teeth is/are provided featuring an orifice for injecting a fluid component.

10. The mixing and kneading machine (1) as set forth in claim 7, characterized in that the main surfaces of the screw vanes (4a, 4b, 4c, 4d) and/or of the kneader pins/teeth are configured at least in part as free-formed surfaces.

11. The mixing and kneading machine (1) as set forth in claim 1, characterized in that the ratio of screw shaft outer diameter (Da) to screw shaft inner diameter (Di) ranges from 1.5 to 2.0, the ratio of screw shaft outer diameter (Da) to stroke (H) ranges from 4 to 6 and the ratio of pitch (T) to stroke (H) ranges from 1.2 to 2.5.

12. A method of implementing continual compounding by means of a mixing and kneading machine (1) configured as set forth in claim 1, characterized in that the screw shaft (3) is operated at a rotational speed ranging from 30 to 80 rpm for compounding plastic and/or pasty masses, the machine (1) being operated such that the products reside in the processing space from 60 to 150 seconds.

13. The method as set forth in claim 12, wherein the mixing and kneading machine is engineered for compounding anodic masses for electrodes and comprises a processing space (6) featuring at least one mixing/homogenizing zone, characterized in that the temperature in the processing space (6) is set to range from 180° C. to 220° C.

14. The method as set forth in claim 13, wherein the processing space (6) comprises in addition to the mixing/homogenizing zone (10) an infeed zone (8) and/or a transition zone, characterized in that the infeed zone (8) and/or the transition zone is fed at least one fluidized component.

15. The method as set forth in claim 14, characterized in that pitch is fed as the fluidized component.

16. A method for using a mixing and kneading machine (1) engineered as set forth in claim 1 comprising operating the mixing and kneading machine to compound anodic masses mainly consisting of carbon for the production of electrodes in obtaining aluminum by means of electrolysis.

17. The method set forth in claim 16, wherein the carbon is provided in the form of coke and pitch.

18. The method set forth in claim 16, wherein the electrode is an anode.

* * * * *